United States Patent
Muldoon

(10) Patent No.: US 7,348,690 B2
(45) Date of Patent: Mar. 25, 2008

(54) PREVENTING UNSAFE OPERATION BY MONITORING SWITCHING MEANS

(76) Inventor: Alfred Wade Muldoon, 2603 Willa Dr., St. Joseph, MI (US) 49085

( * ) Notice: Subject to any disclaimer, the term of this patent is extended or adjusted under 35 U.S.C. 154(b) by 1124 days.

(21) Appl. No.: 10/082,454

(22) Filed: Feb. 25, 2002

(65) Prior Publication Data

US 2003/0161480 A1   Aug. 28, 2003

(51) Int. Cl.
    *H02H 11/00*   (2006.01)
(52) U.S. Cl. .................... 307/326; 361/160; 361/189; 307/140
(58) Field of Classification Search ............... 340/644; 307/116, 129, 139, 140, 326, 141.8; 361/67, 361/54, 51, 160, 189, 93.1; 700/286, 292
See application file for complete search history.

(56) References Cited

U.S. PATENT DOCUMENTS

| | | | | |
|---|---|---|---|---|
| 4,307,392 A * | 12/1981 | Loshbough et al. | ........ | 345/618 |
| 4,795,980 A * | 1/1989 | Schmitt | ........ | 324/423 |
| 4,951,037 A * | 8/1990 | Goossen | ........ | 345/618 |
| 5,064,998 A * | 11/1991 | Holling | ........ | 219/519 |
| 5,124,566 A * | 6/1992 | Hu | ........ | 307/116 |
| 5,436,788 A * | 7/1995 | Wallaert | ........ | 361/160 |
| 5,870,317 A * | 2/1999 | Barnett et al. | ........ | 703/6 |
| 5,973,899 A * | 10/1999 | Williams et al. | ........ | 361/72 |
| 6,047,486 A * | 4/2000 | Reck et al. | ........ | 34/491 |
| 6,120,449 A * | 9/2000 | Snyder et al. | ........ | 600/447 |
| 6,125,870 A * | 10/2000 | Furmanek | ........ | 137/2 |
| 6,198,612 B1* | 3/2001 | Manner | ........ | 361/86 |
| 6,226,602 B1* | 5/2001 | Schmitt et al. | ........ | 702/117 |
| 6,246,181 B1* | 6/2001 | Naruo et al. | ........ | 315/209 R |
| 6,297,569 B1* | 10/2001 | Bartels et al. | ........ | 307/140 |
| 6,347,028 B1* | 2/2002 | Hausman et al. | ........ | 361/93.1 |
| 6,400,163 B1* | 6/2002 | Melcher et al. | ........ | 324/713 |
| 6,674,628 B1* | 1/2004 | Wohlfarth | ........ | 361/153 |

* cited by examiner

*Primary Examiner*—Xu Mei
*Assistant Examiner*—Jason Kurr

(57) ABSTRACT

An electronic control that monitors the switching means used to operate transducers to detect conditions that can cause improper transducer operation. In the application the unenergized state of the transducer is always safe. Should a switch in the transducer circuitry be in an erroneous state, the control uses another switch to prevent improper operation of the transducer without requiring the involvement of the operator. Monitoring enables the control to prevent transducer operation before failures allow hazardous operation. Any switching means, activated by the control, an override, or both may be monitored as long as its intended state is known to the control. The control can also open the transducer circuitry when an externally controlled switch in the transducer circuitry changes state at a destructive rate.

20 Claims, 3 Drawing Sheets

3A

3B

3C

PREVENTING UNSAFE OPERATION BY MONITORING SWITCHING MEANS

CROSS-REFERENCE TO RELATED APPLICATIONS

Not Applicable

STATEMENT REGARDING FEDERALLY SPONSORED RESEARCH

Not Applicable

REFERENCE TO SEQUENCE LISTINGS

Not Applicable

BACKGROUND OF THE INVENTION

The present invention relates to controls that operate transducers. In particular to controls that operate transducers that if erroneously active may result in hazardous operation but are always safe when inactive. In this application, a transducer is a device whose function is to turn the electrical energy into some other energy form. As the operation of the transducers may also be suspended by external switches or circuits the present invention is related to devices that include override(s).

Controls operate transducers using switching means hereinafter referred to as a switch, that may be a switch, relay, transistor, other solid state switch, or the like. Controls use either open or closed loop systems. In an open loop system any failure of switch goes undetected. True closed loop systems monitor the output of transducers, indirectly this may react to a switch in an erroneous state after the fault affects output but it is an expensive and less reliable means to detect switch failures. Further unless the feedback results in opening every switch in a transducer circuit, a switching failure(s) can still produce erroneous operation while the circuit still has a functional switch since the faulty switch(s) could be the one the feedback uses to alter operation.

U.S. Pat. No. 5,760,493 addresses the problem of improper transducer operation in appliances. The method does not detect faults. The intention of U.S. Pat. No. 5,760,493 is to limit improper transducer operation should one of its switches fail. In this approach two switches must be closed to permit transducer operation. If one switch shorts the transducer is erroneously active when the functional switch is closed to operate another transducer. This method only prevents improper operation during part of a cycle. Since faults are not detected, operation continues allowing the possibility of additional faults developing, further compromising safe operation.

U.S. Pat. No. 5,760,493 points out that switching faults are not uncommon when driving large inductive loads. The appliance industry has relied on a plurality of switches to ensure that operation of transducers is stopped at least at the end of a cycle. This plurality of switches includes overrides which directly switch the transducers. However the plurality of switches adds to the cost and reduces overall system reliability.

U.S. Pat. No. 4,866,955 uses switching means to prevent an appliance from operating if its door lid switch has not been opened since the end of the last cycle. The intended state of the switch is not known, it is assumed that the switch must open between cycles. The control is therefore incapable of stopping the appliance should the switch fail to open as intended during a cycle. The prior art shown in U.S. Pat. Nos. 3,367,089, 4,307,392, 4,951,037, shows methods of detecting switching faults that affect transducers. The transducers are display elements. U.S. Pat. Nos. 4,307,392 and 4,951,037 determine the functionality of the transducer and any fault causing any switch to be in an erroneous state. U.S. Pat. No. 3,367,089 only detects faults affecting the switches. These approaches apply only to switching means operated solely by the control.

The application of transducers in these patents can produce unsafe conditions when erroneously unenergized. For this reason the methods in these patents seek to detect erroneously unenergized transducers in addition to detecting erroneously energized transducers. Additionally U.S. Pat. Nos. 4,307,392 and 4,951,037 seek to verify the functionality of the transducer. These are burdens the present invention does not share. In the applications of the present invention a fault in the switching means or its transducer causing it to be inactive does not pose a safety hazard.

In the display verification patents no method is presented to automatically stop hazardous transducer operation. The approach is to signal the operator that a fault has been found to prevent a fault from causing a hazard. If the operator does not receive the fault indicating signal, operation remains potentially unsafe. While the control of the present invention may signal the operator that a fault has been detected, if the operator fails to observe this signal operation is still safe because the control halts transducer operation.

SUMMARY OF INVENTION

Figure 1:
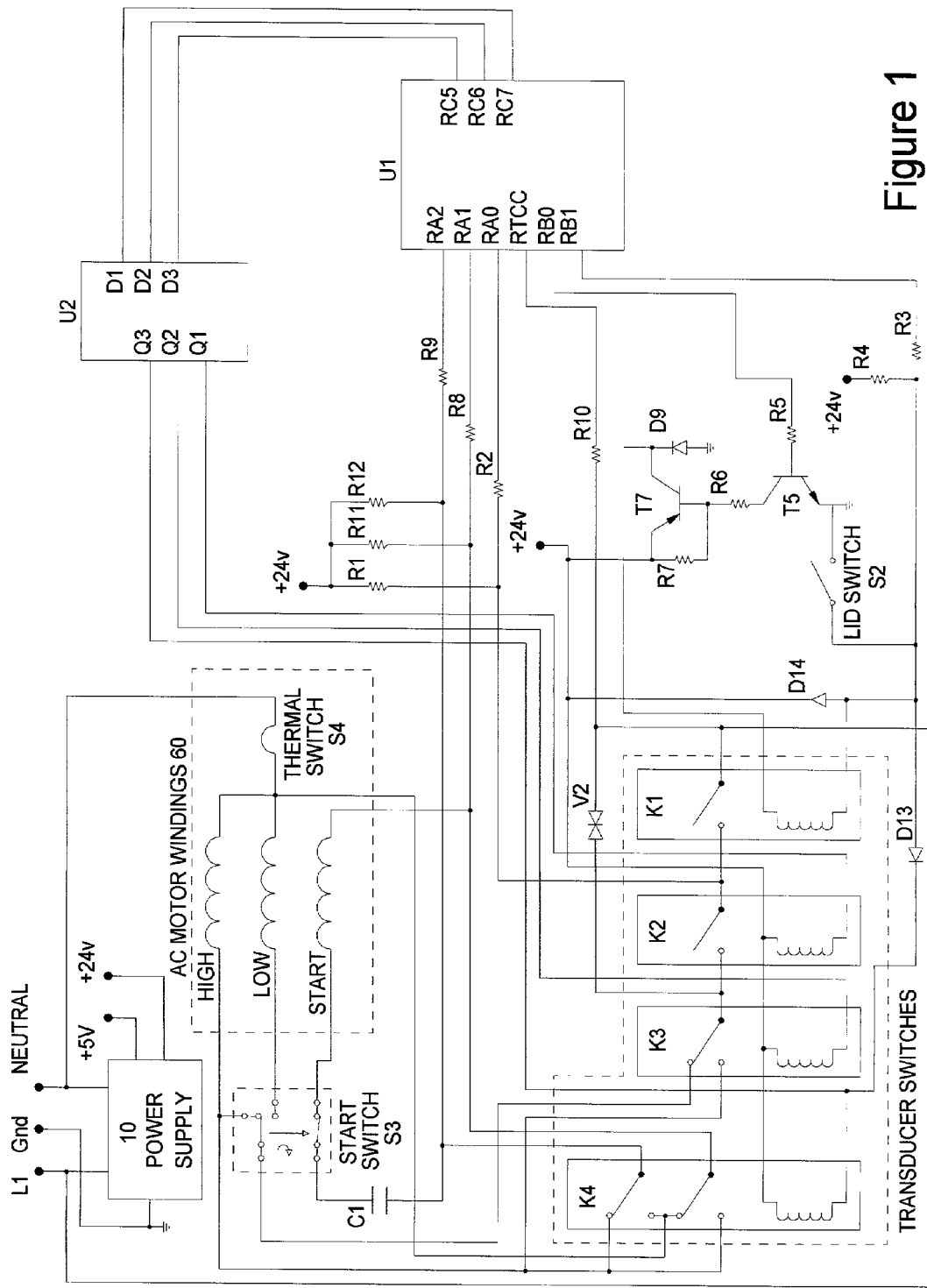
FIG. 1 is a schematic of the control interfacing to the ac source and motor.

The present invention is a control with means to verify the switches in the energizing circuitry of transducer(s) are in the intended state. If a fault is detected, the control automatically uses another switch to open the affected circuit to prohibit the transducer from being erroneously energized. Improper transducer activation is prevented not just limited. While the control may attempt to signal the operator of a fault, hazardous operation is suspended without requiring operator knowledge of the fault. The present invention can detect faults in any switch, including externally operated switching, as long as the intended state of the switch is known to the control.

While commonly either on or off, variable switching is included as long as the control can determine when a transducer is unenergized (switch open). The signal to have a switch open a transducer circuit may originate at: 1) the control. 2) an override. 3) either the control or an override. When the scan of a switch indicates it is in the wrong state, another switch is employed to stop and/or prevent current to the transducer.

Failures in the switch itself, in the interfacing of the control or an override to that switch, or an incorrectly open or shorted path in the energizing circuitry can cause the switch to be non-functional. Scanning the energizing circuitry allows the control to detect non-functional switches regardless of the cause.

As long as one control operated switch in a circuit is functional the control is able to prevent operation of the transducer(s) in a faulty circuit. The scanning methods included and introduced in an application filed concurrently by the same inventor are very inexpensive. In many cases one resistor connecting a single digital input to a node common to similar transducers allows the control to verify the state of the switches for a plurality of transducers.

The preferred implementation of an override is to share with the control a monitored transducer switch(s) that either can open regardless of the functionality of the other. The ability of an override to stop operation independently of the control is maintained and the control can signal the switch to open at anytime to verify its functionality. Fewer load switches lower cost and increase reliability. Further the control can monitor the override input to the transducer switch, should the primary load switch fail to open as the override dictates, the control opens the transducer circuit with a backup switch(s).

Generally the only non-functional switches the control must detect are erroneously closed. An exception is when the switch(s) of a transducer circuit determines the polarity of the voltage across a transducer. If the state of any switch permits an incorrect voltage to be present at the transducer the control opens a switch(s) ensuring the transducer can not be energized.

The control can also open a transducer circuit when the frequency at which an externally operated switch changes state rather than the state itself can lead to hazardous operation. The control extends the period the transducer circuit is open reducing the switching rate. This prevents damage to the switch and/or the transducer.

DESCRIPTION OF PREFERRED EMBODIMENT

Although the following embodiment is a commercial washing machine employing relays to switch a 120 vac motor and transistors to switch 24 v valves it is to be understood that the inventor contemplates the invention being applied to other devices with the same or different transducers and switching means operating off various voltages.

In the preferred embodiment the control scans the circuitry used to energize the +24 v solenoid valves P1-5 and the 120 vac motor 60 of a commercial washing machine the control operates. If a fault in the circuitry is found that could cause a valve or the motor to be erroneously energized, the control uses another switch to open or keep open the faulty circuitry until it is repaired. Then the control signals the operator that the washer requires service.

Figure 2:
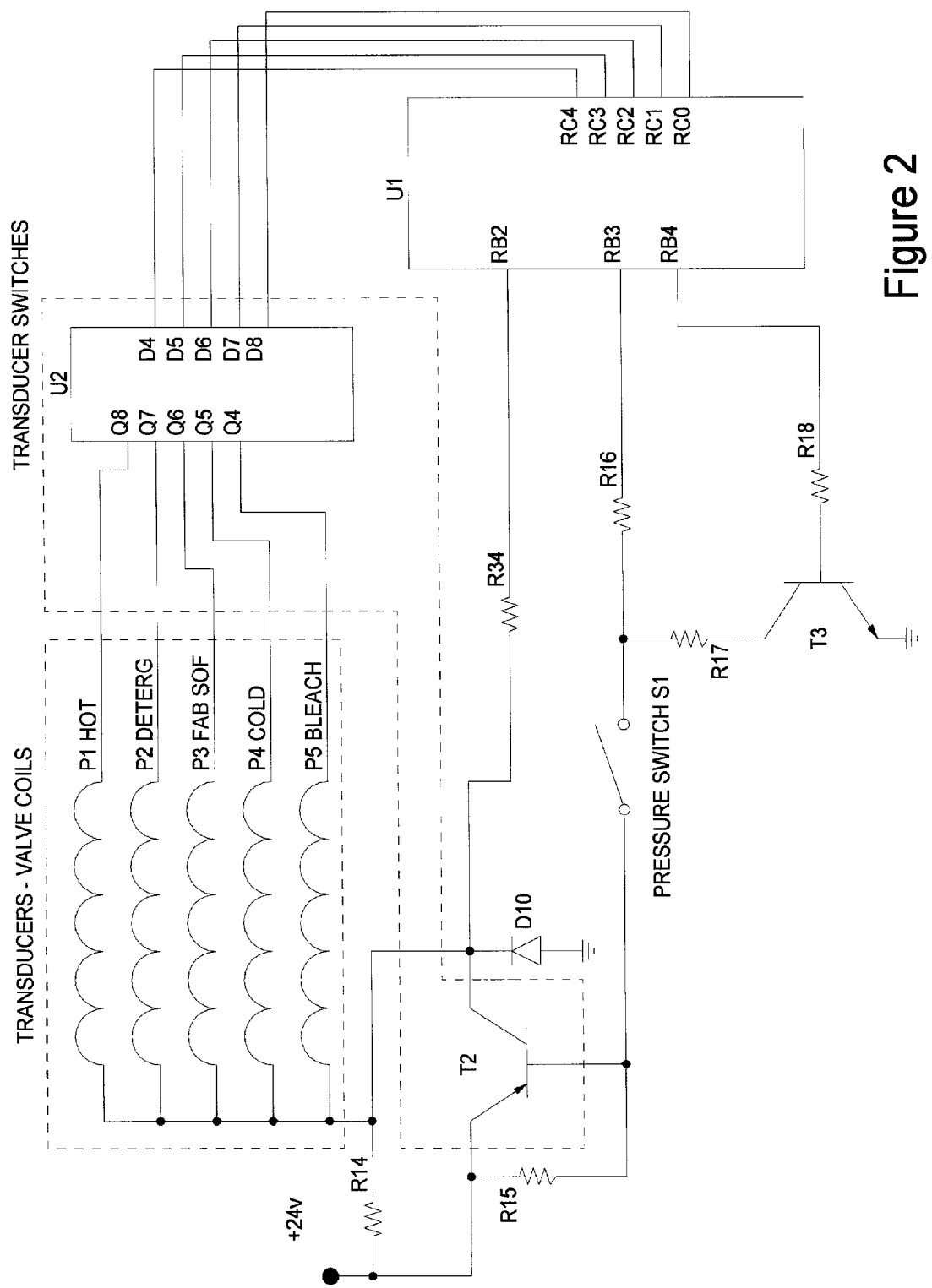
FIG. 2 is a schematic of the circuits used to drive the dc valves.

The motor drive circuitry is shown in FIG. 1 and the valve drive circuitry is shown in FIG. 2. In addition to the valves and motor, the washer includes a power supply 10 that produces +24 v, +5 v relative to ground that is in common with ac source ground. The switches of the energizing circuitry in this embodiment include the output transistors of U2, transistor T2, relays K1-K4, centrifugal switch S3 and thermal limit switch S4.

Switches S1-S4 are overrides. Switches S3-S4 directly switch the motor. Pressure switch S1 shares operation of T2 with the control enabling either to open the valves P1-P5. The pressure switch S1 is closed until the fill level is reached. The lid switch S2 shares operation of K1 with the control enabling either to stop the motor. S2 is closed when the lid of the washer is closed. The motor start switch S3 ensures the HIGH and START windings are energized to start the motor, it opens shortly after the motor starts. The thermal switch S4 is closed unless the motor overheats.

The motor is switched using relays K1-K4. FIG. 1 shows the interfacing of the control to the ac source and the motor. The thermal limit switch S4 and both K1 and K2 must close to turn on the motor. K1 is the switching relay responsible for starting and stopping the motor. K2 is the safety relay and serves as the backup switch for K1. Both K1 and K2 are protected by varistor V2 to limit arcing when either is opened.

The speed of the motor is determined by K3. When K3 is energized the motor will run in HIGH. When K3 is unenergized the motor will start in HIGH and run in LOW once the centrifugal switch S3 opens shortly after the motor starts. The direction the motor turns is determined by the polarity of the connections made by K4 though C1 and S3 to the START winding. When K4 is energized the washer will agitate. When K4 is off the washer will spin. When the motor reaches speed, the centrifugal switch S3 opens the START winding circuit and switches the motor speed to LOW if K3 is unenergized.

The control uses the npn transistor driver IC U2 to turn on K2, K3 and K4. The coil of each of these relays has a direct connection to +24 v. Q1 connects K2 to ground when RC7 takes D1 high. Q2 connects K3 to ground when RC6 takes D2 high. Q3 connects K4 to ground when RC5 takes D3 high. The control only partially controls the operation of K1. The connection of K1 to +24 v is made through T7. U1 turns on T7 by turning on T5 through R5. When on, T5 takes the common node of R7, R6 and T7 low enough to turn on T7. The connection of K1 to ground is made directly by the lid switch S2 and/or by Q3 through D13. The diode D14 protects S2, diode D9 protects T7 and the internal diodes of U2 protect its output transistors when the coils of the relays are turned off.

To start the washer in agitate Q3 connects K4 to ground. In agitate Q3 also connects the coil of K1 to ground through D13. In agitate opening the lid switch S2 has no effect on the operation of the washer. To start the washer in spin Q3 disconnects K4 from ground and leaving S2 as the sole connection of K1 to ground. In spin if S2 opens K1 will open stopping the motor regardless of the state and functionality of U1 and T7.

The control verifies the state of the ac switches K1, K2 and K4. The sensing means for the relays also determines the state of the thermal switch S4. If the thermal switch S4 is open the control suspends operation until the motor cools sufficiently to close S4. If K1 or K2 is erroneously closed when the motor is off, the control will not close the other until repairs have been made. If K1 fails to open as intended by the control or the lid switch S2, the control opens K2 stopping the motor until repairs are made. The state of K4 is verified to ensure that the motor is started in the proper direction. If the connections to the START winding are not at the proper voltages during start up the control opens K1 to stop the motor.

The signals on RA0-RA2 produced by the connections through R2, R8 and R9 respectively are used to determine the state of the ac switches. The ac nodes driving these inputs are in one of three states—L1, Neutral or floating. A node at L1 produces the truncated 60 hz sine wave in FIG. 3A. A floating node is taken high by the pull-up resistor (R1, R11 or R12) on its input producing the signal in FIG. 3B. A Neutral node produces a low input signal in FIG. 3C. The resistance of each connection is sufficient to allow the input protection diodes of inputs RA0-RA2 and RTCC to limit the signals to +5.6 v and −0.6 v, a safe range for U1. The input RTTC is connected to L1 through R10 producing the signal in FIG. 3A.

Before the functionality of switches at least partially operated by the control can be verified, the control verifies that the override switch S4 is closed. When S4 is closed either RA1 or RA2 (or both RA1 and RA2 when either K1 or K2 is open) will have the signal produced by a Neutral node—FIG. 3C. When S4 is open neither RA1 or RA2 has the signal in FIG. 3C since there is no connection to Neutral. To verify that S4 is closed RA1 and RA2 are read when RTCC goes high. If at least one is low, S4 is closed since only a Neutral node is low when RTCC is high.

Figure 3:
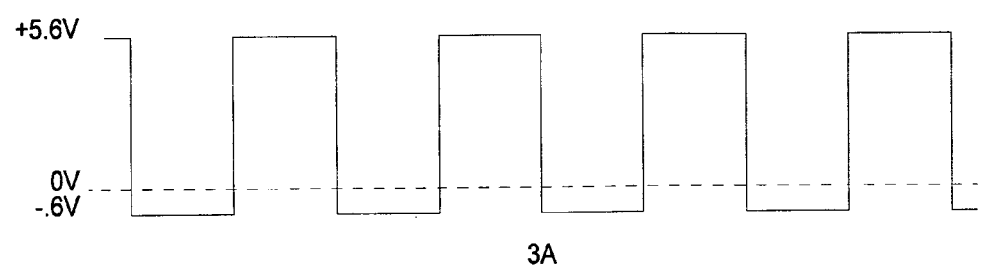
FIG. 3 shows the signals produced on the control inputs connected to ac nodes.
Figure 3:
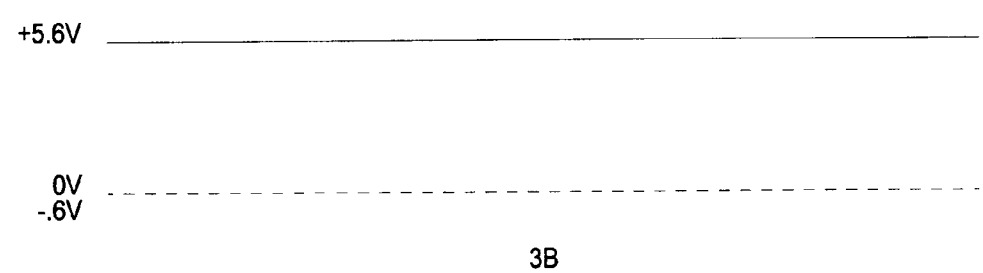
Figure 3:
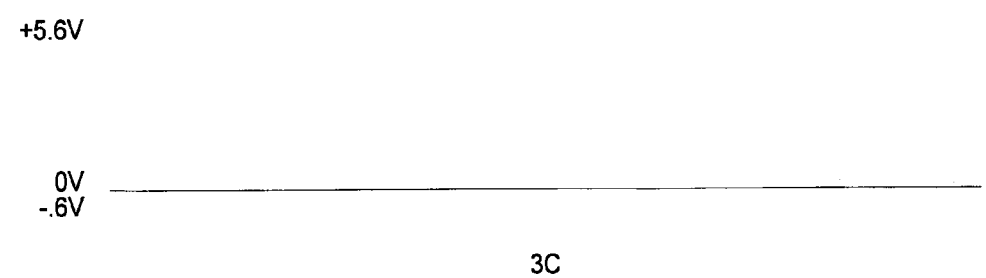

With S4 closed, the control scans the state of K1, K2 and K4. To verify the states of K1 and K2 the control reads the signal on RA0 through R2. Before a cycle is started the ac node sensed by RA0 is floating if K1 and K2 are open as expected. R1 pulls RA0 high when the ac node is floating (FIG. 3B). If K2 alone has shorted the ac node connected to RA0 is at Neutral producing the signal in 3C. If K1 is closed the ac node is at L1 producing the 60 hz signal in FIG. 3A. The control reads RA0 when RTCC goes low, if RA0 is high both K1 and K2 are open. If it is low there is a fault and the control will not close K1 or K2 to start a cycle until repairs are made.

The control also checks the state of the switching relay K1 each time the motor is stopped. K1 is opened by the control to stop the motor as required during a cycle or by the opening of the lid switch S2 when the motor is rotating in the spin direction. The control reads the state of S2 on RB1 through R3. In spin R4 pulls RB1 high if S2 is open. The state of K1 is verified each time either the control or S2 attempts to open it. If K1 has opened the signal on RA1 is pulled low through K2 by the connection of the motor to Neutral. If RA0 is not low when RTCC goes high the control opens K2 stopping the motor until repairs can be made.

The control also monitors the connections of K4 to the START winding to verify the motor will rotate in the correct direction. In the operation of this washer it is critical that the motor stops if S2 is opened during spin. If a fault causes the START winding to have the incorrect voltage when the motor is started the washer could be in spin when the control intends for it to be in agitate. In this state the motor would not stop when S2 is opened during this erroneous spin since S2 has no effect on the motor in agitate.

To start the motor in agitate, K4 is energized. When functioning correctly the ac node sensed by RA1 is at L1 and the ac node sensed by RA2 is at Neutral producing the signals in FIGS. 3A and 3C respectively. When RTCC goes high RA1 should be high and RA2 should be low. When RTCC goes low both RA1 and RA2 should be low. If either of these conditions are not met the control stops the operation of the motor by opening K1 using K2 as backup until repairs are made.

The method shown to scan the ac circuitry depends on the sharing of ground between the source and the supply. In consumer appliances the common ground approach is generally not employed. An application filed concurrently by the same inventor provides a cost effective method of sensing ac path states, including paths containing switches, when the control is floating relative to the ac source.

In addition to monitoring the state of K1 and K2 the control monitors the frequency at which the K1 is switched in spin by S2. Should the rate of switching become destructive, the time K1 is open is prolonged by taking RB0 low turning off T7. This breaks the connection of K1 to +24 v preventing the motor from restarting when S2 is closed.

After pausing to allow the contacts of K1 to cool RB0 goes high turning on T7 allowing normal operation to resume. The rate is monitored by reading RA0 whenever RTCC is high. If K1 is open RA0 is low if K1 is closed RA0 is high. The frequency at which K1 is switched by S2 can also be indirectly monitored by reading the input RB1.

The valves are switched using transistors as shown in FIG. 2. Transistor T2 completes the valve connections to +24 v. The npn transistors of U2 outputs Q8-Q4 complete the valve connections to ground. D10 protects T2 when it switches the valves. U2 has internal protection diodes on its outputs to protect it.

To energize a valve, both T2 and the corresponding output line of U2 (Q8-Q4) must be switched on. If the control detects a short of T2 to +24 v or a short of any valve line Q8-Q4 to ground the control will use the functional transistor(s) to open or keep open valve circuitry until repairs can be made.

Q8 switches the hot valve P1, Q7 switches the detergent valve P2, Q6 switches the fabric softener valve P3, Q5 switches the cold valve P4, and Q4 switches the bleach valve P5. Outputs Q8-Q4 are turned on when U1 take inputs D8-D4 high using RC0-RC4.

R15 turns off T2 if S1 is open or T3 is off. T2 is on when the path from its base to ground through S1, R17 and T3 is complete. U1 turns on T3 through R18 by taking RB4 high. When S1 opens, a functional T2 opens regardless of the functionality of the rest of the control.

The state of the valve switches, T2 and Q8-Q4, are scanned using input RB2 through R34. The resistance of R34 is sufficient to permit the input protection diodes of U1 to limit the input voltage on RB2 to +5.6 v. The scan detects any fault causing T2 or Q8-Q4 to be erroneously on. If a short is detected when the valves are inactive the control will not start a fill keeping the functional transistor(s) off. The switches are also scanned at the end of a fill. T2 is always used to turn off the valves for all dispensing. If T2 fails to open the circuitry, U2 is cleared turning off Q4-Q8 deenergizing the valve(s).

Before a fill starts both T2 and the individual valve lines Q4-Q8 are off. R14 pulls input RB2 high unless a U2 output drive(s) Q4-Q8 has shorted to ground pulling RB2 low indicating the failure. If no valve line has shorted to ground, the control turns on the valve line(s) to be used, pulling RB2 low unless T2 has shorted. If T2 has shorted to +24 v, RB2 would remain high.

When a fault is detected the control will not start a fill cycle. For the transistors energizing the valves or their selection means to cause flooding, both T2 and a U2 output would have to short to their respective supply voltage between scans since the control will open the valves using the other transistor at the first failure.

The functionality of the valve switches is also checked when the fill is complete. A fill is complete when the pressure switch S1 opens or when U1 takes RB4 low turning off T3 to end a timed dispense. For a measured fill the control reads the state of S1 on RB3 through R16. The resistance of R16 is sufficient to permit the input protection diodes to limit the input voltage on RB3 to +5.6 v. R16 also prevents a fault shorting RB3 to ground from turning on T2. When S1 opens during a fill RB3 goes low. In either type of fill, the valve(s) are switched off when the base to ground connection of T2 is broken by opening either S1 or T3. When T2 opens RB2 should be low. If not the control clears U2 turning off Q4-Q8.

While the pressure switch S1 could also be monitored for destructive switching as is done with S2, T2 is much less likely to fail due to switching rate and given the hysteresis of the pressure switch S1 it is unlikely to be switched at an excessive rate.

While the embodiment present employs only one backup switch per transducer it is within the scope of this invention to include more. Further operation of the device can continue indefinitely or to a preferred time such as the end of a cycle after a fault is found by using a backup switch to perform the function of the failed one. With multiple backups operation can continue until only one functional switch remains.

Alternatively upon detection of a fault the control can trigger a fuse or circuit breaker to open, permanently stopping transducer operation until repairs are made.

It is claimed:

1. A device including a control, said device having a first energizing circuit, said first energizing circuit containing at least one first transducer, said first energizing circuit containing a plurality of first switches, said device including circuitry allowing said control to operate said first switches, said first transducer requiring a first current to be energized, said first switches capable of carrying said first current, said device including a first sensing means to scan said first energizing circuit, said first transducer having a potential to cause said device to operate in a hazardous manner if said first transducer is mistakenly energized, said first transducer never causing said device to operate in a hazardous manner when said first transducer is in an unenergized state, said first energizing circuit having first idle periods throughout which said first switches are expected to be open, said control using said first sensing means to;

identify each of said first switches as either first functional switches or first erroneously closed switches during said first idle periods, identify any of said first switches as said first functional switches that said first sensing means verifies are open during said first idle periods, identify any of said first switches as said first erroneously closed switches that said first sensing means verifies are not open during said first idle periods, said control using said first functional switches to preclude said first current from flowing through said first erroneously closed switches, preventing said first transducer from being mistakenly energized.

2. The device in accordance with claim 1 wherein said control uses one sensor of said first sensing means to identify more than one of said first switches as either said first functional switches or said first erroneously closed switches during said first idle periods.

3. The device in accordance with claim 1 wherein said first energizing circuit has a first paused period, said first paused period beginning when said control attempts to stop said first current by opening one of said first switches, said first paused period ending when said first current resumes, throughout said first paused period one of said first functional switches opens if and only if said first sensing means determines said first current has not stopped.

4. The device in accordance with claim 1 wherein said device includes a first override, said first energizing circuit containing a first override switch being connected to and solely operated by said first override, said first override being in one of two states, a normal state or an override state, during said normal state said first override switch is expected to be closed, during said override state said first override switch is expected to be open, said first override also having a connection to an input of said control, said input informing said control whether said first override is in said override state or said normal state, said first energizing circuit having a first paused period, said first paused period beginning when said first override attempts to stop said first current by opening said first override switch, said first paused period ending when said first current resumes, throughout said first paused period one of said first functional switches opens if and only if said first sensing means determines said first override switch has not opened.

5. The device in accordance with claim 1 wherein said device includes a first override, said first energizing circuit containing a first override switch, said first override connected to said first override switch, said first override switch being one of said first switches, said first override being in one of two states, a normal state or an override state, during said normal state said first override switch is solely operated by said control, during said override state, as a direct consequence of said first override, said first override switch is expected to be open, said first override also having a connection to an input of said control, said input informing said control whether said first override is in said override state or said normal state.

6. The device in accordance with claim 5 wherein said first energizing circuit has a first paused period, said first paused period beginning when said first override attempts to stop said first current by opening said first override switch, said first paused period ending when said first current resumes, throughout said first paused periods one of said first functional switches opens if and only if said first sensing means determines said first override switch has not opened.

7. The device in accordance with claim 1 wherein said first energizing circuit includes a multi-throw switch, said multi-throw switch having an intended state, said intended state is known to said control, said control;

identifying said multi-throw switch as a non-functional multi-throw switch if said sensing means verifies said multi-throw switch is not in said intended state, using said first functional switches to preclude said non-functional multi-throw switch from causing said first transducer to be mistakenly energized.

8. The device in accordance with claim 1 wherein said first energizing circuit contains at least one externally operated switch, said externally operated switch having an externally determined intended state, said control being unaware of said externally determined intended state, said first sensing means determining whether said externally operated switch is open or closed.

9. The device in accordance with claim 1, said device having a second energizing circuit, said second energizing circuit containing at least one second transducer, said second energizing circuit containing a plurality of second switches, said device including circuitry allowing said control to operate said second switches, said second transducer requiring a second current to be energized, said second switches capable of carrying said second current, said control having circuitry to operate said second switches, said device including a second sensing means to scan said second energizing circuit, said second transducer having a potential to cause said device to operate in a hazardous manner if said second transducer is mistakenly energized, said second transducer never causing said device to operate in a hazardous manner when said second transducer is in an unenergized state, said second energizing circuit having second idle periods throughout which each of said second switches are expected to be open, said control using said second sensing means to;

identify each of said second switches as either second functional switches or second erroneously closed switches during said second idle periods, identify any of said second switches as said second functional switches that said second sensing means verifies are open during said second idle periods, identify any of said second switches as said second erroneously closed switches that said second sensing means verifies are not open during said second idle periods, said control using said second functional switches to preclude said second current from flowing through said second erroneously closed switches, preventing said second transducer from being mistakenly energized.

10. The control in accordance with claim 9 wherein said first sensing means and said second sensing means have a common sensor, said control uses said common sensor to identify one or more of said first switches as either said first functional switches or said first erroneously closed switches during said first idle periods and one or more of said second switches as either said second functional switches or said second erroneously closed switches during said second idle periods.

11. An electronic control having output circuitry to operate a device, said control including sensing means to scan said output circuitry, said output circuitry including one or more energizing circuits, said energizing circuits containing one or more transducers, said transducers requiring currents to be energized, said energizing circuits including switches, said switches capable of carrying said currents, said switches having intended states, said energizing circuits carrying said currents, said transducers having a potential to cause said device to operate in a hazardous manner if said transducers are mistakenly energized, said transducers never causing said device to operate in a hazardous manner when said transducers are in an unenergized state, at least one of said switches being a monitored switch, said monitored switch changing state at a frequency, each of said energizing circuits, that include said monitored switch, having off periods when no electricity flows through said monitored switch, said control;

using said sensing means to ascertain said frequency said monitored switch changes state, prolonging said off periods if said frequency is too high for said monitored switch to safely operate.

12. The electronic control in accordance with claim 11 wherein said sensing means scans said energizing circuits.

13. The electronic control in accordance with claim 12 wherein said intended states of said switches are known to said control whether said intended states are set by said control or an override in said device, said control;

identifying any of said switches as functional switches that said sensing means verifies are in said intended states, identifying any of said switches as non-functional switches that said sensing means verifies are not in said intended states, using at least one of said functional switches to preclude said currents from flowing through one or more of said non-functional switches preventing said transducers from being mistakenly energized.

14. The electronic control in accordance with claim 13 wherein said energizing circuits contain at least one externally operated switch, said externally operated switch having an externally determined intended state, said control being unaware of said externally determined intended state, said sensing means determining whether said externally operated switch is open or closed.

15. The electronic control in accordance with claim 13 wherein at least one sensor of said sensing means scans said switches in a plurality of said energizing circuits.

16. The electronic control in accordance with claim 12 wherein said intended states of said switches are known to said control whether said intended states are set by said control or an override in said device, said control identifying any of said switches as functional switches that said sensing means verifies are open when said intended states are open, said control identifying any of said switches as erroneously closed switches that said sensing means verifies are not open when said intended states are open, using at least one of said functional switches to preclude said currents from flowing through one or more of said erroneously closed switches preventing said transducers from being mistakenly energized.

17. The electronic control in accordance with claim 16 wherein at least one of said switches can be independently opened by either said control or an override.

18. The electronic control in accordance with claim 16 wherein at least one sensor of said sensing means scans said switches in a plurality of said energizing circuits.

19. The electronic control in accordance with claim 16 wherein said energizing circuits contain at least one externally operated switch, said externally operated switch having an externally determined intended state, said control being unaware of said externally determined intended state, said sensing means determining whether said externally operated switch is open or closed.

20. The electronic control in accordance with claim 12 wherein said energizing circuits include a first energizing circuit, said switches in said first energizing circuit being first switches, at least one of said transducers being a first transducer, said first energizing circuit including said first transducer, said first transducer requiring a first current to be energized, said first switches capable of carrying said first current, said sensing means including a first sensing means, said control using said first sensing means to scan said first energizing circuit, said first energizing circuit having first idle periods throughout which said first switches are expected to be open, said control using said first sensing means to;

identify each of said first switches as either first functional switches or first erroneously closed switches during said first idle periods, identify any of said first switches as said first functional switches that said first sensing means verifies are open during said first idle periods, identify any of said first switches as said first erroneously closed switches that said first sensing means verifies are not open during said first idle periods, said control using said first functional switches to preclude said first current from flowing through said first erroneously closed switches, preventing said first transducer from being mistakenly energized.

\* \* \* \* \*